US012563190B2

(12) United States Patent
Gao et al.

(10) Patent No.: US 12,563,190 B2
(45) Date of Patent: Feb. 24, 2026

(54) CCSO WITH ADAPTIVE FILTER UNIT SIZE

(71) Applicant: Tencent America LLC, Palo Alto, CA (US)

(72) Inventors: Han Gao, Palo Alto, CA (US); Xin Zhao, Palo Alto, CA (US); Liang Zhao, Palo Alto, CA (US); Jing Ye, Palo Alto, CA (US); Shan Liu, Palo Alto, CA (US)

(73) Assignee: TENCENT AMERICA, LLC, Palo Alto, CA (US)

( * ) Notice: Subject to any disclaimer, the term of this patent is extended or adjusted under 35 U.S.C. 154(b) by 0 days.

(21) Appl. No.: 18/660,064

(22) Filed: May 9, 2024

(65) Prior Publication Data
US 2025/0126252 A1     Apr. 17, 2025

Related U.S. Application Data

(60) Provisional application No. 63/544,409, filed on Oct. 16, 2023.

(51) Int. Cl.
H04N 19/117          (2014.01)
H04N 19/172          (2014.01)
H04N 19/82           (2014.01)

(52) U.S. Cl.
CPC ......... H04N 19/117 (2014.11); H04N 19/172 (2014.11); H04N 19/82 (2014.11)

(58) Field of Classification Search
CPC .. H04N 19/172; H04N 19/117; H04N 19/597; H04N 19/82; H04N 19/186;
(Continued)

(56) References Cited

U.S. PATENT DOCUMENTS

| | | | | |
|---|---|---|---|---|
| 11,438,582 B2 * | 9/2022 | Lee | ..................... | H04N 19/159 |
| 2012/0027083 A1 * | 2/2012 | Narroschke | ........... | H04N 19/61 |
| | | | | 375/240.03 |

(Continued)

FOREIGN PATENT DOCUMENTS

WO     WO 2021185929 A2     9/2021

OTHER PUBLICATIONS

Tencent America LLC, ISR/WO, PCT/US2024/030271, Aug. 21, 2024, 17 pgs.

(Continued)

*Primary Examiner* — Masum Billah
(74) *Attorney, Agent, or Firm* — Morgan, Lewis & Bockius LLP

(57)          ABSTRACT

Various implementations described herein include methods and systems for coding video. In one aspect, a video bitstream includes a current image frame and a first filter control parameter for a loop filter to process a first filtering block of the current image frame. An electronic device receives the video bitstream and determines a filter unit size for processing the current image frame by the loop filter. The first filtering block has the filter unit size. The first filtering block is identified in the current image frame based on the filter unit size. When the first filter control parameter is enabled, the loop filter is applied to process one or more samples of the first filtering block. The current image frame includes the first filtering block.

23 Claims, 7 Drawing Sheets

(58) Field of Classification Search
CPC ...... H04N 19/52; H04N 19/70; H04N 19/105;
H04N 19/119; H04N 19/176; H04N
19/593; H04N 19/11; H04N 19/132
USPC ......................................................... 375/240
See application file for complete search history.

(56)                       References Cited

U.S. PATENT DOCUMENTS

| | | | |
|---|---|---|---|
| 2022/0109832 A1* | 4/2022 | Du ....................... | H04N 19/124 |
| 2022/0150490 A1 | 5/2022 | Kuo et al. | |
| 2022/0248006 A1* | 8/2022 | Lim .................... | H04N 19/176 |
| 2023/0115242 A1* | 4/2023 | Laroche ................ | H04N 19/44 |
| | | | 375/240.02 |

OTHER PUBLICATIONS

Peter de Rivaz et al., "AV1 Bitstream & Decoding Process Specification", Version 1.0.0 with Errata 1, Alliance for Open Media, Jan. 2019, 681 pgs.

* cited by examiner

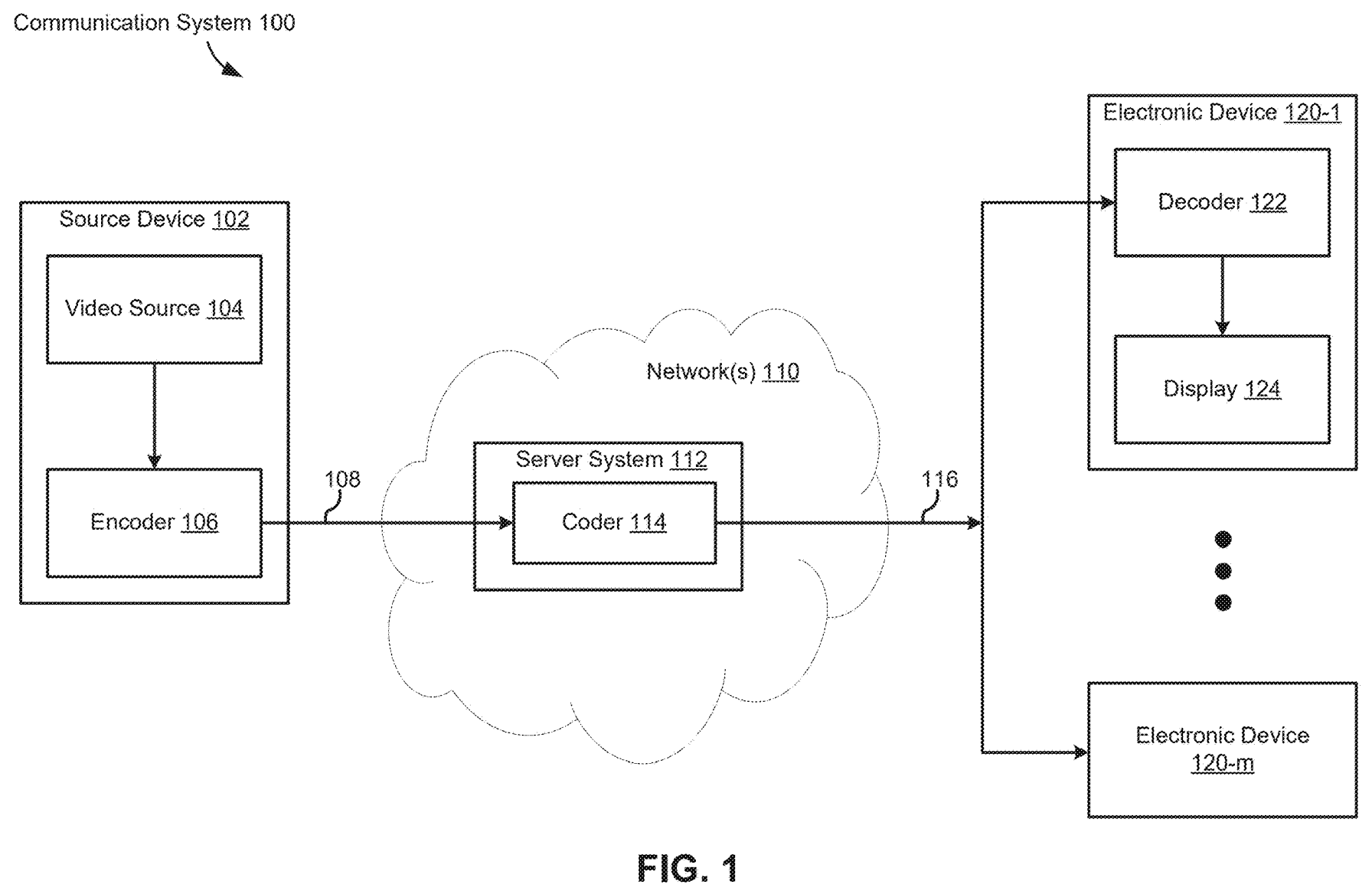

Communication System 100

Electronic Device 120-1

Decoder 122

Display 124

Electronic Device 120-m

Network(s) 110

Server System 112

Coder 114

116

108

Source Device 102

Video Source 104

Encoder 106

FIG. 1

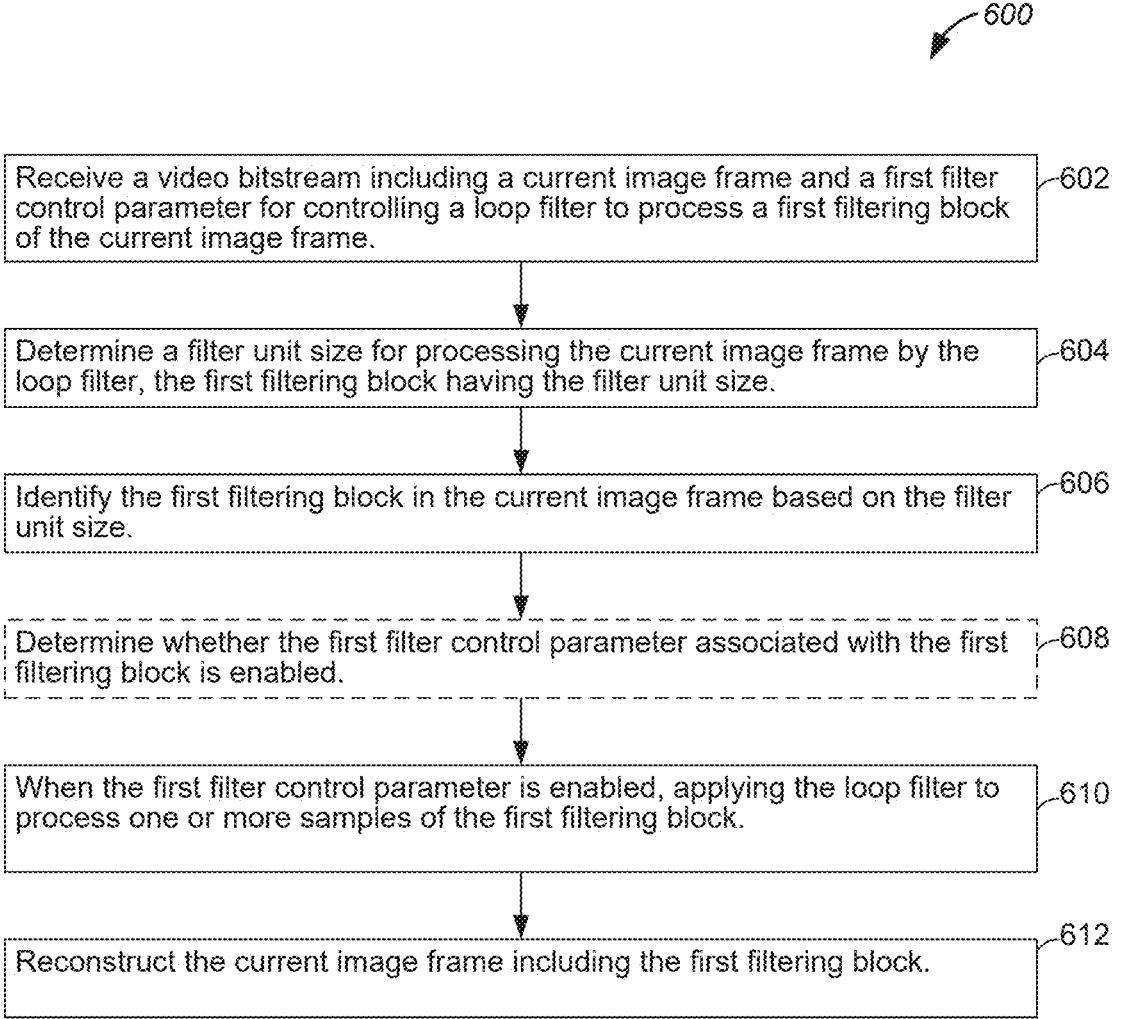

*—600*

Receive a video bitstream including a current image frame and a first filter control parameter for controlling a loop filter to process a first filtering block of the current image frame.  —602

Determine a filter unit size for processing the current image frame by the loop filter, the first filtering block having the filter unit size.  —604

Identify the first filtering block in the current image frame based on the filter unit size.  —606

Determine whether the first filter control parameter associated with the first filtering block is enabled.  —608

When the first filter control parameter is enabled, applying the loop filter to process one or more samples of the first filtering block.  —610

Reconstruct the current image frame including the first filtering block.  —612

FIG. 6

CCSO WITH ADAPTIVE FILTER UNIT SIZE

RELATED APPLICATIONS

This application claims priority to U.S. Provisional Patent Application No. 63/544,409, entitled "CCSO with Adaptive Filter Unit Size," filed Oct. 16, 2023, which is hereby incorporated by reference in its entirety.

TECHNICAL FIELD

The disclosed embodiments relate generally to video coding, including but not limited to systems and methods for loop filtering (e.g., cross-component offset filtering) of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes methods, systems, and non-transitory computer-readable storage media for applying a loop filter for video (image) compression. A video codec includes a plurality of function modules for one or more of: intra/inter prediction, transform coding, quantization, entropy coding, and in-loop filtering. In-loop filtering technologies are applied to adjust reconstructed picture samples to further reduce a reconstruction error. In various embodiments of this application, a filter control parameter is streamed with a current image frame for a loop filter to process a first filtering block of the current image frame. Upon receiving the filter control parameter, a video decoder may identify the first filtering block, determine that the filter control parameter is enabled, and apply the loop filter to process the first filtering block.

In some embodiments, the loop filter includes a cross-component sample offset (CCSO) filter, which uses co-located reconstructed samples and its neighboring reconstructed samples from a first color component (e.g., luma samples) to derive a sample offset value to be added on a current sample of a second color component (e.g., a luma or chroma sample). In some embodiments, the CCSO filter may include an edge preserving loop filter that relies on values of reconstructed samples to determine the sample offset value of luma and/or chroma samples. For each color component, a respective filter control parameter may be signaled on a frame level for the CCSO filter, and a filter on/off control flag is further signaled on a filter unit level to control application of the respective control parameter on each individual filter unit. In an example, a filter unit size is fixed as 256×256 luma samples, which correspond to 128× 128 chroma samples. Further, adaptive filter unit sizes may be used to enable flexibility of the cross-components sample offset.

In accordance with some embodiments, a method of video decoding is provided. The method includes receiving a video bitstream including a current image frame and a first filter control parameter for a loop filter to process a first filtering block of the current image frame; determining a filter unit size for processing the current image frame by the loop filter, the first filtering block having the filter unit size; identifying the first filtering block in the current image frame based on the filter unit size; when the first filter control parameter is enabled, applying the loop filter to process one or more samples of the first filtering block; and reconstructing the current image frame including the first filtering block.

In accordance with some embodiments, a method of video encoding is provided. The method includes receiving video data comprising a current image frame; encoding the current image frame; transmitting the encoded current image frame via a video bitstream; and signaling, via the video bitstream, a first filter control parameter for a loop filter to process a first filtering block of the current image frame. A filter unit size is configured to be determined for processing the current image frame by the loop filter, and applied to identify the first filtering block to be processed by the loop filter based on the first filter control parameter.

In accordance with some embodiments, a method of bitstream conversion is provided. The method includes obtaining a source video sequence including a current image frame and performing a conversion between the source video sequence and a video bitstream. The video bitstream comprises: the current image frame and a first filter control parameter for a loop filter to process a first filtering block of the current image frame. A filter unit size is configured to be determined for processing the current image frame by the loop filter, and applied to identify the first filtering block to be processed by the loop filter based on the first filter control parameter.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 6 is a flow diagram illustrating a method of coding video, in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
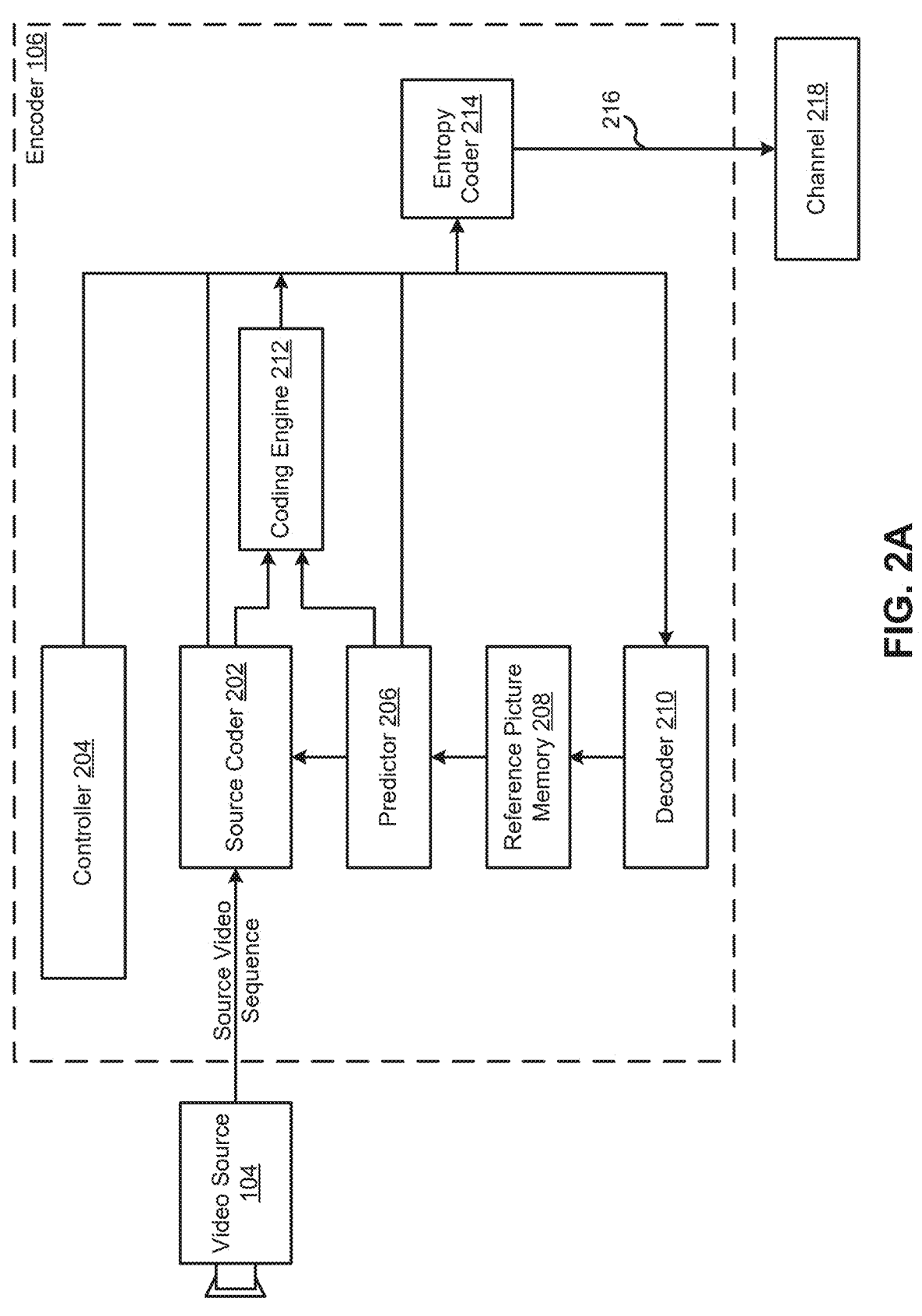
FIG. 2A is a block diagram illustrating example elements of an encoder component in accordance with some embodiments.

The present disclosure describes methods, systems, and non-transitory computer-readable storage media for applying a loop filter for video (image) compression. In-loop filtering technologies are applied to adjust reconstructed picture samples to further reduce a reconstruction error. In various embodiments of this application, a filter control parameter is streamed with to a video decoder a current image frame for a loop filter to process a first filtering block of the current image frame. Upon receiving the filter control parameter, the video decoder may identify the first filtering block, determine that the filter control parameter is enabled, and apply the loop filter to process the first filtering block. In some embodiments, the loop filter includes a CCSO filter, which uses reconstructed samples of a first color component (e.g., luma samples) to derive a sample offset value to be added on a sample of a second color component (e.g., a luma or chroma sample). The CCSO filter may include an edge preserving loop filter that relies on values of reconstructed samples to determine the sample offset value of luma and/or chroma samples. For each color component, a respective filter control parameter may be signaled on a frame level for the CCSO filter, and a filter on/off control flag is further signaled on a filter unit level to control application of the respective control parameter to each individual filter unit.

A cross-component offset filtering method is implemented to apply a collocated reconstructed sample and associated neighboring reconstructed samples of a first color component to derive an offset value that is added on a current sample of a second color component, thereby adjusting a reconstruction value of the current sample. In various embodiments of this application, a decoder receives a video bitstream from an encoder including a current image frame and a first filter control parameter for a loop filter of a first color sample is determined based on values of one or more luma samples, e.g., independently of any associated luma gradient of the one or more luma samples. Sample values (e.g., not associated gradient values) of a first color component are used in offset filtering to determine an offset value that is added on a sample of a second color component.

More specifically, in some embodiments, a video decoder identifies a set of luma samples including a first luma sample and one or more neighboring luma samples of the first luma sample. The luma samples are quantized, e.g., using a scalar quantizer, to generate one or more quantized values. The scalar quantizer may be specified by quantization intervals (e.g., ranges of values assigned to the same integer) and quantization levels (e.g., integer values to which a quantization interval is assigned). A first color sample is classified, e.g., by a classifier, based on the one or more quantized values to determine a first sample offset of the first color sample. The first color sample is adjusted based on the first sample offset of the first color sample, thereby enabling reconstruction of the current image frame.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
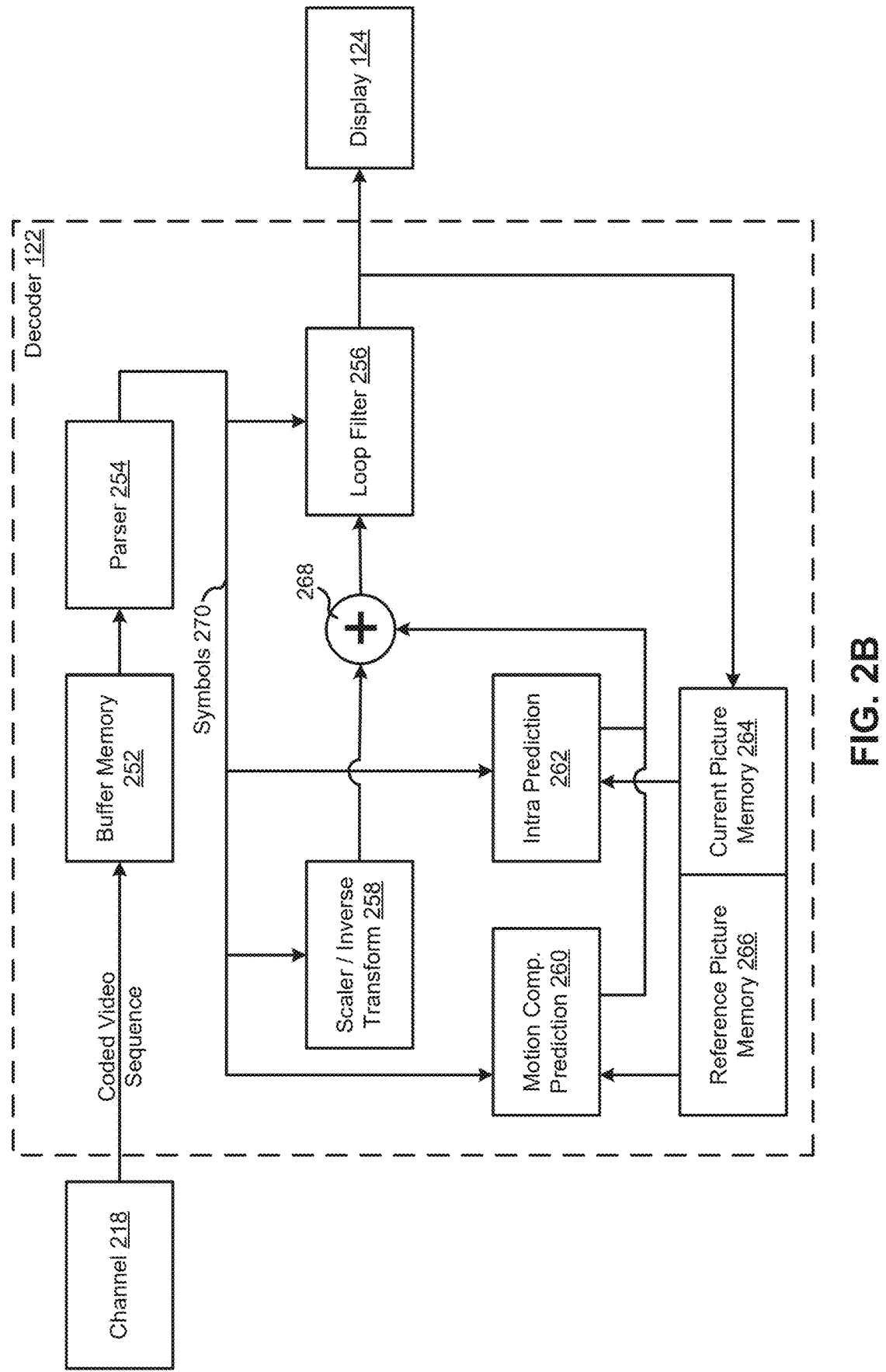
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
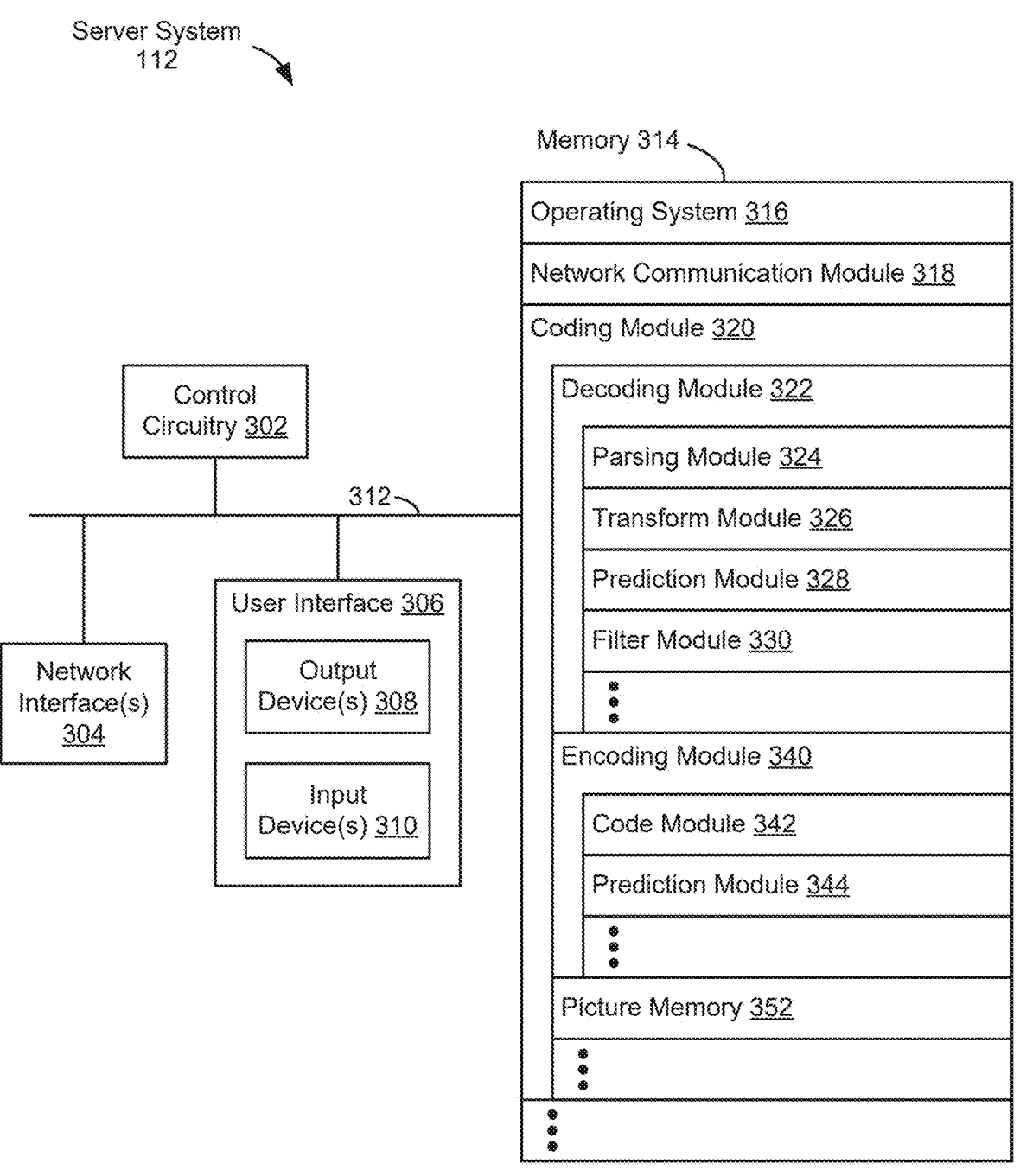
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

an operating system 316 that includes procedures for handling various basic system services and for performing hardware-dependent tasks;

a network communication module 318 that is used for connecting the server system 112 to other computing devices via the one or more network interfaces 304 (e.g., via wired and/or wireless connections);

a coding module 320 for performing various functions with respect to encoding and/or decoding data, such as video data. In some embodiments, the coding module 320 is an instance of the coder component 114. The coding module 320 including, but not limited to, one or more of:

a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
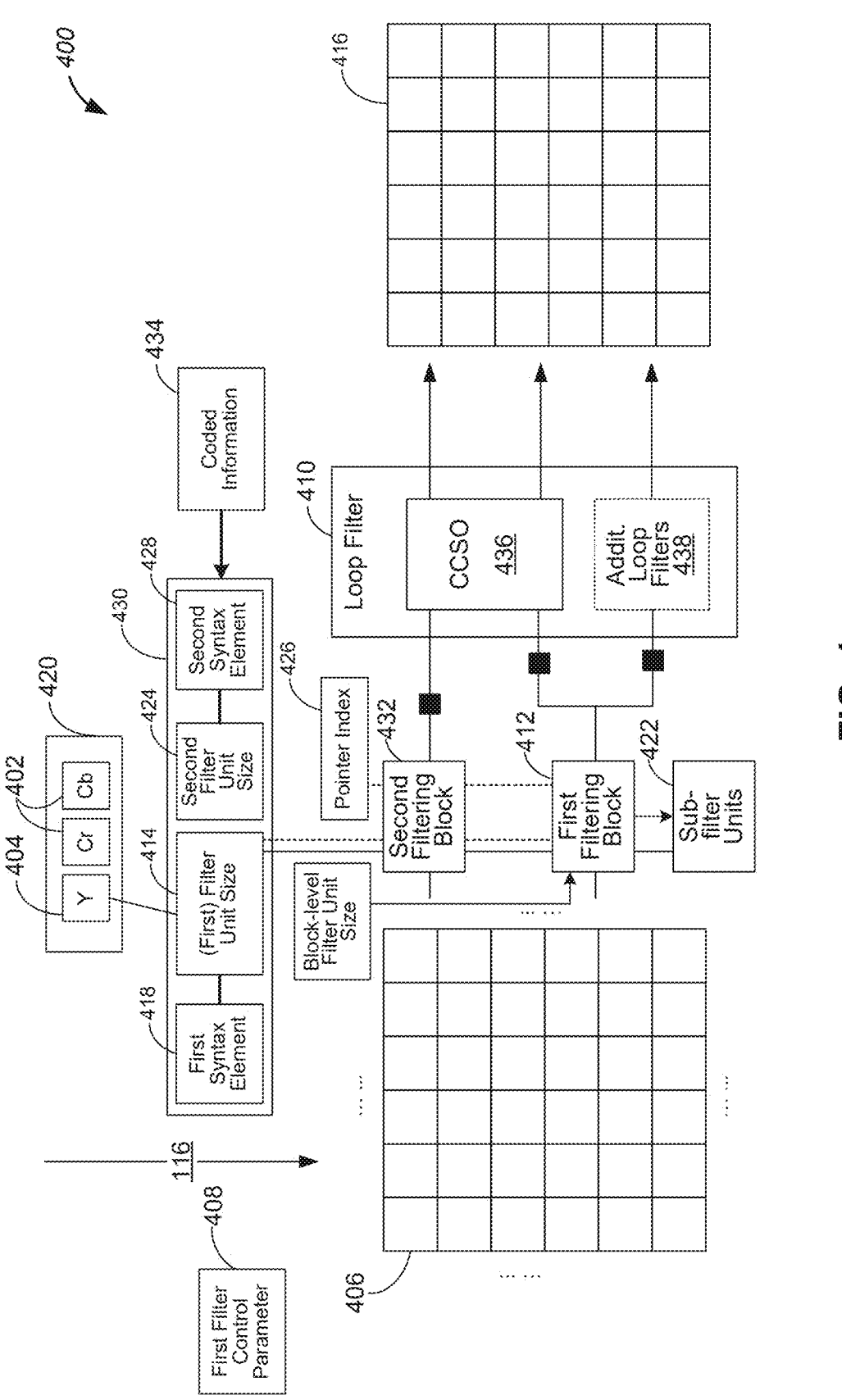
FIG. 4 is a flow diagram of an example process 400 of decoding a video bitstream with in-loop filtering based on a first filter control parameter 408, in accordance with some embodiments.

FIG. 4 is a flow diagram of an example process 400 of decoding a video bitstream with in-loop filtering based on a first filter control parameter 408, in accordance with some embodiments. A GOP includes a sequence of image frames that further includes a current image frame 406. The current image frame 406 includes a color image, i.e., a non-monochrome image frame, which has a plurality of color samples (e.g., chroma samples 402 and luma samples 404) co-located with one another. After the plurality of color samples of the current image frame 406 are reconstructed, in-loop filtering is applied to adjust a subset of color samples, thereby improving an image quality of the current image frame 406. An example of in-loop filtering is CCSO filtering. In some embodiments associated with CCSO filtering, a reconstructed sample and its neighboring reconstructed samples of a first color component are combined to derive an offset value for a second color component, and a reconstructed sample of the second color component is co-located with the reconstructed sample of the first color component and adjusted by the offset value. The first color component is optionally identical to or distinct from the second color component.

In some embodiments, a decoder 122 receives a video bitstream 116 including the current image frame 406 and a first filter control parameter 408 for a loop filter 410 to process a first filtering block 412 of the current image frame 406. The decoder 122 determines a filter unit size 414 for processing the current image frame 406 by the loop filter 410. The first filtering block 412 has the filter unit size 414. The first filtering block 412 is identified in the current image frame 406 based on the filter unit size 414. In some embodiments, the decoder 122 determines whether the first filter control parameter 408 associated with the first filtering block 412 is enabled. When the first filter control parameter is enabled, the decoder 122 applies the loop filter 410 to process one or more samples of the first filtering block 412. The current image frame 406 including the first filtering block 412 is reconstructed to generate a reconstructed image frame 416. In some embodiments, the first filtering block 412 is defined on a frame level and applied to a plurality of filtering blocks including the first filtering block 412, and a block-level flag is used to indicate and determine whether the first filter control parameter 408 is applied on the first filtering block 412.

In some embodiments, the video bitstream 116 includes a first syntax element 418 indicating the filter unit size 414 for processing the current image frame 406 by the loop filter 410. The first syntax element 418 may be signaled for a first one (e.g., luma component 404) of a plurality of color components 420 on one of: a sequence level, a frame level, and a tile header of the current image frame. The filter unit size 414 may be determined based on the first syntax element 418 signaled by the video bitstream 116. Further, in some embodiments, the video bitstream 116 includes a plurality of syntax elements 430 that further include the first syntax element 418, and the plurality of syntax elements 430 may be signaled for the plurality of color components 420 separately.

In some embodiments, the filter unit size 414 includes a first filter unit size, and a second one of the plurality of color components (e.g., a chroma component 402) is not signaled and has a second filter unit size. The second filter unit size may have a predefined relationship with, is configured to be determined based on, the first filter unit size. Additionally, in some embodiments, the plurality of color components 420 include a luma component 404 and a chroma component 402 (e.g., red-difference chroma (Cr) component, blue-difference chroma (Cb) component). The current image frame 406 has a chroma format of 4:2:0. The second filter unit size is twice or a half of the first filter unit size, depending on whether the first filter unit size corresponds to a chroma component 402 or a luma component 404. For example, the first filter unit size of the luma component 404 is determined to include 256×256 luma samples based on the first syntax element 418 defining the filter unit size 414. Based on the predefined relationship with the first filter unit size of luma samples 404, the second filter unit size of the chroma samples 402 is determined as 128×128 chroma samples. The second filter unit size of the chroma samples 402 is a half of the first filter unit size of the luma samples 404 on each dimension (e.g., width, length) of a filter unit. In another example, the first filter unit size for the luma component 404 is 128×128 luma samples, and the second filter unit size for the chroma components 402 is 64×64 chroma samples.

In some embodiments, the current image frame 406 has a superblock size representing the largest coding unit size applied to code the current image frame 406, and the filter unit size 414 is equal to or greater than the superblock size. Further, in some embodiments, the superblock size is 128× 128 pixels. A first filter unit size for the luma component 404 of the current image frame 406 is 128×128 luma samples, and a second filter unit size for the chroma components 402 of the current image frame 406 is 64×64 chroma samples corresponding to 128×128 pixels. In some embodiments, the video bitstream 116 includes a first syntax element 418 indicating the filter unit size 414 for processing the current image frame 406 by the loop filter 410, and the first syntax element 418 is signaled based on the superblock size. In some embodiments, the video bitstream 116 includes a first syntax element 418 indicating the filter unit size 414 for processing the current image frame 406 by the loop filter 410, and the first syntax element 418 includes a binary integer that is equal to a difference of a binary logarithm of the filter unit size 414 and a binary logarithm of the superblock size. For example, the superblock size is 128× 128 pixels represented by a first binary logarithm value of 14, and the filter unit size 414 is 256×256 represented by a second binary logarithm value of 16. The first syntax element 418 is equal to 2, and represented to "010."

In some embodiments, the first filtering block 412 is split into a plurality of sub-filter units 422 according to a tree structure, and a control flag associated with the first filter control parameter 408 is signaled on a sub-filter unit level and corresponds to a first one of the sub-filter units 422 of the first filtering block 412. The first filter control parameter 408 is signaled on a frame level for the current image frame 406, and the filter unit size 414 corresponds to a fixed largest filter unit size. Inside of each filter unit (e.g., the first filtering block 412), a tree structure is used to further split the filter unit, e.g., recursively, into the sub filter units 422. In an example, the first filter control parameter 408 is associated with CCSO filtering. A CCSO on/off flag or other control parameters are signaled at the sub-filter unit's level for individual sub-filer units 422.

In some embodiments, the video bitstream 116 includes a first syntax element 418 indicating the filter unit size 414 for processing the current image frame by the loop filter 410. The first syntax element 418 is signaled on a frame level for the current image frame 406. The filter unit size 414 includes a fixed filter unit size. The video bitstream 116 further includes a second syntax element 428 indicating a block-level filter unit size 424 for a set of one or more superblocks of the current image frame 406. The second syntax element 428 includes an index defining a scaling factor between the fixed filter unit size 414 and the block-level filter unit size 424. Further, in some embodiments, the index is equal to one of 0, 1, 2, and corresponds to the scaling factor equal to one of 1, 4, and 16, respectively, and the block-level filter unit size is equal to 1×, 4×, or 16× of the fixed filter unit size.

In some embodiments, the video bitstream 116 further includes a pointer index 426 associated with a second filtering block 432 of the current image frame 406, and the pointer index 426 identifies the first filtering block 412 and controls the loop filter 410 to process the second filtering block 432 based on the first filter control parameter 408 associated with the first filtering block 412.

In some embodiments, the filter unit size 414 of the current image frame 406 is determined based on coded information 434. The coded information 434 includes one or more of: a quantization parameter, an image resolution, a tile size, whether the current image frame is an intra-only frame, a temporal layer, and whether the current image frame is an interpolated frame. Further, in some embodiments, the current image frame 406 is interpolated from two additional image frames in the GOP. In an example, the filter unit size 414 is not signaled, and determined based on the coded information 434. In another example, the filter unit size 414 is signaled in the first syntax element 418. The first syntax element 418 includes an index selecting the filter unit size 414 from a plurality of filter unit size options, which are determined based on the coded information 434.

In some embodiments, the filter unit size 414 includes a first filter unit size. An alternative image frame corresponds to a second filter unit size for processing the alternative image frame by the loop filter 410. A resolution of the current image frame is greater than a resolution of the alternative image frame, and the first filter unit size is greater than the second filter unit size.

In some embodiments, the loop filter 410 includes a CCSO mode 436, and the first filter control parameter 408 indicates whether the CCSO mode 436 is enabled to apply one or more samples of a first color component (e.g., luma samples 404) to determine sample offsets of samples of a second color component (e.g., luma samples 404, chroma samples 402). Further, in some embodiments, the loop filter 410 further includes one or more additional filtering operations 438 (e.g., Weiner filtering) distinct from the CCSO mode 436, and the filter unit size 414 is signaled in a first syntax element 418 for the CCSO mode 436 and the one or more additional filtering operations 438 jointly. The one or more additional filtering operations may include at least one of Wiener filtering and cross-component Wiener filtering.

Figure 5:
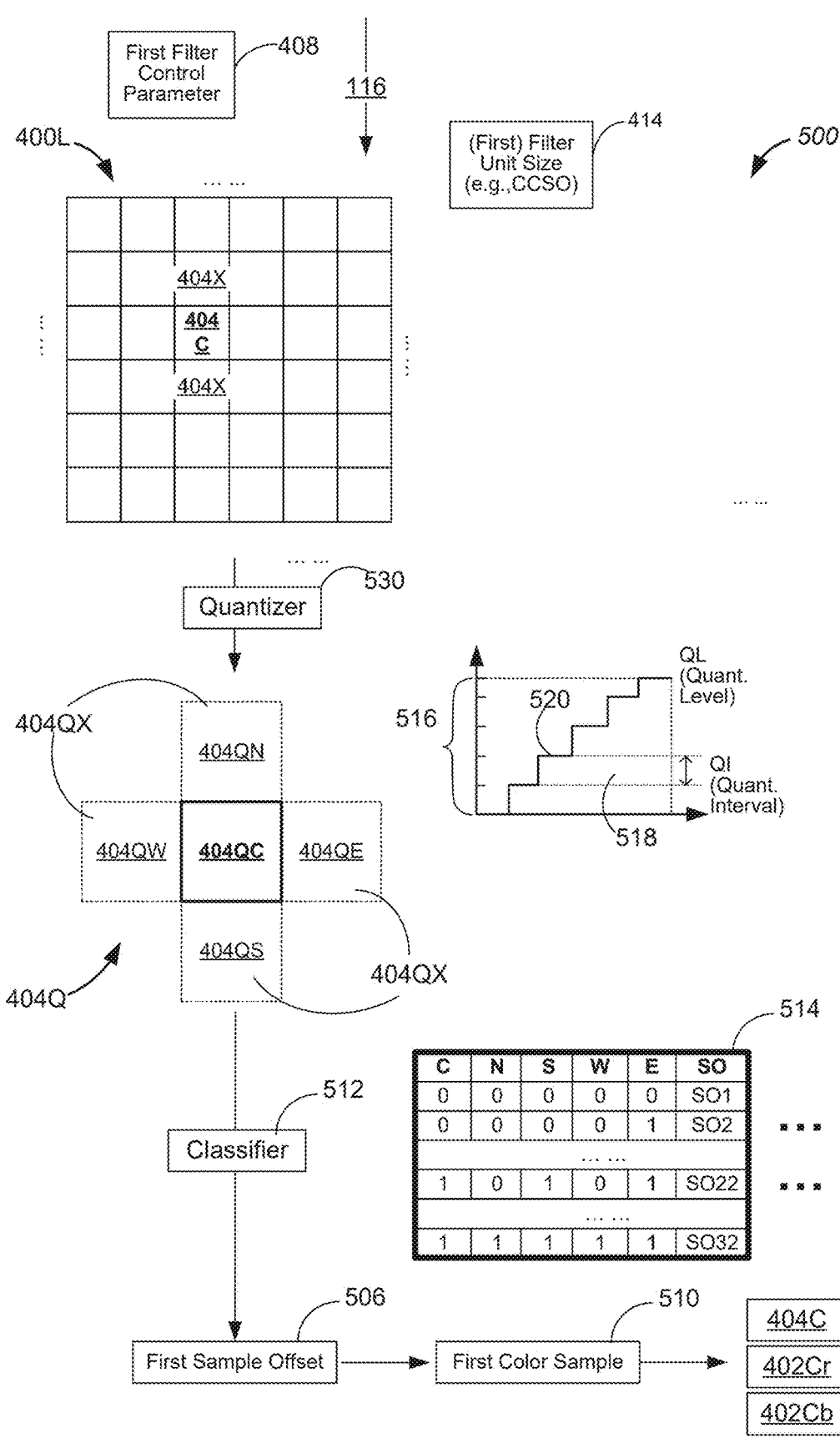
FIG. 5 is a flow diagram of an example process of applying cross-component sample offset in in-loop filtering, in accordance with some embodiments.

FIG. 5 is a flow diagram of an example process 500 of applying cross-component sample offset in in-loop filtering, in accordance with some embodiments. A decoder 122 receives a video bitstream 116 including the current image frame 406 and a first filter control parameter 408 for a loop filter 410 to process a first filtering block 412 of the current image frame 406. The decoder 122 determines a filter unit size 414 for processing the current image frame 406 by the loop filter 410. The first filtering block 412 has the filter unit size 414. The first filtering block 412 is identified in the current image frame 406 based on the filter unit size 414. When the first filter control parameter is enabled, the decoder 122 applies the loop filter 410 to process one or more samples of the first filtering block 412. The current image frame 406 including the first filtering block 412 is reconstructed to generate a reconstructed image frame 416. In some embodiments, the loop filter 410 includes a CCSO mode 436, and the first filter control parameter 408 indicates whether the CCSO mode 436 is enabled to apply one or more samples of a first color component (e.g., luma samples 404) to determine sample offsets of samples of a second color component (e.g., luma samples 404, chroma samples 402), e.g., on a frame level of the current image frame 406.

In some embodiments, a set of one or more luma samples 404 is identified in the one or more samples of the first color component. The set of one or more luma samples 404 includes one or more of a first luma sample 404C and one or more neighboring luma samples 404X. The first luma sample 404C is collocated with a first color sample 510 of the second color component to be determined in the first filter block 412. A first sample offset 506 of the first color sample 510 is determined based on the set of one or more luma samples 404. The first color sample 510 is adjusted based on the first sample offset 506 of the first color sample 510.

In some embodiments associated with edge offset, one or more difference values are determined between the one or more neighboring luma samples 404X and the first luma sample 404C that is collocated with of the first color sample 510. The one or more difference values are quantized to generate one or more quantized values 404Q. The first color sample 510 is classified based on the one or more quantized values 404Q to determine the first sample offset 506 of the first color sample 510. Alternatively, in some embodiments associated with band offset, the set of luma samples 404 (e.g., the first luma sample 404C) is quantized to generate one or more quantized values 404Q. Luma values (not gradient values or different values) of the set of luma samples 404 are quantized. The first color sample 510 is classified based on the one or more quantized values 404Q to determine the first sample offset 506 of the first color sample 510. The decoder 122 reconstructs the current image frame 406 at least by adjusting the first color sample 510 based on the first sample offset 506.

In some embodiments, the first color sample 510 is one of: the first luma sample 404C, a first red-difference chroma (Cr) sample 402Cr, and a first blue-difference chroma (Cb)

sample 402Cb. The first luma sample 404C, the first Cb sample 402Cb, and the first Cr sample 402Cr are collocated with one another.

The first color sample 510 is classified, e.g., by a classifier 512, based on the quantized values 404Q to determine the first sample offset 506 of the first color sample 510. In an example, the quantized values 404Q include the quantized values 404QC, 404QN, 404QS, 404QW, and 404QE. A lookup table 514 maps a plurality of combinations of the quantized values 404QC, 404QN, 404QS, 404QW, and 404QE to different sample offset options SO (e.g., SO1-SQ16). Based on the lookup table 514, the quantized values 404Q correspond to one of the combinations in the lookup table 514, and a corresponding sample offset option SO is identified to correspond to a combination of the quantized values 404Q and therefore selected for the first sample offset 506. In other words, in some embodiments, the decoder 122 classifies the first color sample 510 by identifying a combination of the one or more quantized values 404Q in a lookup table 514 associating a plurality of quantized combinations with a plurality of offset value options SO (e.g., SO1-SO16) and determining the first sample offset 506 corresponding to the combination of the one or more quantized values 404Q in the lookup table 514.

In some embodiments, values of luma sample(s) 404A (not associated difference values or gradients) are quantized to a plurality of integer values in a quantization range 516 using a scalar quantizer 530 including a plurality of quantization intervals 518 (QI) and a plurality of quantization levels 520 (QL), and each of the one or more quantized values 404Q includes a respective integer in the quantization range 516. For each integer value in the quantization range 516, a quantization interval 518 is defined to be a range of values assigned to the respective integer value. A quantization level 520 corresponds to the respective integer value to which the range of difference values associated with the quantization interval 518 are assigned.

In some embodiments, in the band offset only mode 440, only the first luma sample 404C is quantized, e.g., by the quantizer 530, and classified to determine the first sample offset 506 of the first color sample 510. The first luma sample 404C is determined to be associated with one of a plurality of bands. Each of the plurality of bands corresponds to a respective sample offset value. The first sample offset 506 is determined to be equal to the respective sample offset value corresponding to the one of the plurality of bands.

The first color sample 510 is adjusted based on the first sample offset 506 of the first color sample 510, thereby enabling reconstruction of the current image frame. In some embodiments, the first color sample 510 includes a first chroma sample 402C that is co-located with the first luma sample 404C in the current image frame, and the first chroma sample 402C is adjusted based on the first sample offset 506. Alternatively, in some embodiments, the first color sample 510 is the first luma sample 404C, and the first luma sample 404C is adjusted based on the first sample offset 506.

FIG. 6 is a flow diagram illustrating an example method 600 of coding video, in accordance with some embodiments. The method 600 may be performed at a computing system (e.g., the server system 112, the source device 102, or the electronic device 120 in FIG. 1) having control circuitry and memory storing instructions for execution by the control circuitry. In some embodiments, the method 600 is applied jointly with one or more video codecs, including but not limited to, H.264, H.265/HEVC, H.266/VVC, AV1 and AVS/AVS2/AVS3. A filter unit size 414 is adaptively selected and signaled into the bitstream 116. A first filter control parameter 408 may be associated with a CCSO on/off decision flag, an alternative loop filter on/off decision, or another in-loop filtering control parameter. The first filter control parameter 408 is signaled, and applied according to the filter unit size 414. In some embodiments, a first filter unit size 414 is signaled at a frame level for each color component (e.g., luma component, Cr component, Cb component) separately. In some embodiments, the filter unit size 414 is signaled at a sequence level or a tile level.

In some embodiments, the first filter unit size 414 is signaled using a high level syntax (e.g., on a frame level, a sequence level, or a tile level), and shared among two or more color components (e.g., Cr and Cb components luma and chroma components) depending on a color format of a current image frame 406. For example, for video data having a 4:2:0 chroma format, the first filter unit size 414 is signaled for one of the luma component, and the filter unit size 414 for the chroma samples 402 is half of the signaled filter unit size 414. Stated another way, the signaled filter unit size 414 associated with the luma component doubles the filter unit size of the chroma samples.

In some embodiments, the signaled filter unit size 414 cannot be smaller than a superblock size. Stated another way, the signaled filter unit size 414 is equal to, or greater than, the superblock size, i.e., has a lower limit on the superblock size. For example, the superblock size is 128×128 pixels. A first filter unit size for the luma component 404 of the current image frame 406 is 128×128 luma samples, and a second filter unit size for the chroma components 402 of the current image frame 406 is 64×64 chroma samples corresponding to 128×128 pixels. In some embodiments, depending on the superblock size, the filter unit size 414 is signaled differently. For example, the superblock size is 128×128 pixels, and the filter unit size 414 is 64×64 for a chroma sample 402. The filter unit size 414 is not signaled, and is set to the superblock size by default. In another example, In some embodiments, a difference between the filter unit size 414 and superblock size is signaled, and the difference may be represented as a difference of a logarithm base 2 value of the filter unit size 414 and a logarithm base 2 value of the superblock size. For example, the superblock size is 128×128 pixels represented by a first binary logarithm value of 14, and the filter unit size 414 is 256×256 represented by a second binary logarithm value of 16. The difference is equal to 2, and represented by the first syntax element 418 as "010."

In some embodiments, the filter unit size 414 corresponds to a fixed largest filter unit size. Inside of each filter unit (e.g., the first filtering block 412), a tree structure is used to further split the filter unit, e.g., recursively, into the sub filter units 422. In an example, the first filter control parameter 408 is associated with CCSO filtering. A CCSO on/off flag or other control parameters are signaled at the sub-filter unit's level for individual sub-filer units 422. In some embodiments, the filter unit size 414 is signaled at the frame level. For a set of superblocks (e.g., a single superblock, a row of superblocks, a column of superblocks), a scaling factor between the frame-level filter unit size 414 and a block-level filter unit size 424 is signaled. For example, an index is signaled, and may be equal to one of 0, 1, 2, which corresponds to the scaling factor equal to one of 1, 4, and 16, respectively. The block-level filter unit size 424 is equal to 1×, 4×, or 16× of the frame-level filter unit size 414.

In some embodiments, fixed or recursive filter unit sizes 414 are signaled with first syntax elements 418, e.g., on a frame level. CCSO set on/off flags or other control parameters are signaled at a filter unit level or at a sub-filter unit level. These flags may be merged and shared between filter units (also called filtering blocks) to reduce signaling overhead. For instants, a first filtering block may be signaled with a flag/index to indicate where control parameters are inherited from. In some embodiments, the filter unit size 414 may be signaled jointly for multiple loop filterers (e.g., a CCSO filter 436 and an additional loop filter 438). In an example, the filter unit size 414 is jointly signaled for CCSO filtering 436, wiener filtering (e.g., cross-component Wiener filtering).

In some embodiments, a plurality of applicable filtering unit size options are not fixed, and may be determined based on coded information 434 including but not limited to, one or more of: quantization parameter, picture resolution, tile size, whether it is intra-only frame, temporal layer of the current frame, and whether it is an interpolated frame. In an example, for video frames with different resolutions, the applicable filtering unit size options may be different. An image frame having a higher resolution may correspond to larger filtering unit size options 414. In another example, an interpolated frame refers to a frame that is reconstructed by interpolating two coded frames.

Although FIG. 6 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In some implementations, a method 600 is implemented for decoding video data. The method 600 includes receiving (operation 602) a video bitstream including a current image frame and a first filter control parameter for a loop filter to process a first filtering block of the current image frame; determining (operation 604) a filter unit size for processing the current image frame by the loop filter, the first filtering block having the filter unit size; identifying (operation 606) the first filtering block in the current image frame based on the filter unit size; when the first filter control parameter is enabled, applying (operation 610) the loop filter to process one or more samples of the first filtering block; and reconstructing (operation 612) the current image frame including the first filtering block. In some embodiments, the method 600 further includes determining (operation 608) whether the first filter control parameter associated with the first filtering block is enabled.

(A2) In some embodiments of A1, the video bitstream includes a first syntax element indicating the filter unit size for processing the current image frame by the loop filter. The first syntax element is signaled for a first one of a plurality of color components in one of: a sequence level, a frame level, and a tile header of the current image frame. The filter unit size is determined based on the first syntax element signaled by the video bitstream.

(A3) In some embodiments of A2, the video bitstream includes a plurality of syntax elements that further include the first syntax element, and the plurality of syntax elements are signaled for the plurality of color components separately.

(A4) In some embodiments of A2 or A3, the filter unit size includes a first filter unit size, and a second one of the plurality of color components is not signaled and has a second filter unit size. The second filter unit size has a predefined relationship with, is configured to be determined based on, the first filter unit size.

(A5) In some embodiments of A4, the plurality of color components include a luma component and a chroma component, and the current image frame has a chroma format of 4:2:0. The second filter unit size is twice or a half of the first filter unit size.

(A6) In some embodiments of any of A1-A5, the current image frame has a superblock size representing the largest coding unit size applied to code the current image frame, and the filter unit size is equal to or greater than the superblock size.

(A7) In some embodiments of A6, a first filter unit size for luma components of the current image frame is 128×128, and a second filter unit size for chroma components of the current image frame is 64×64.

(A8) In some embodiments of A6 or A7, the video bitstream includes a first syntax element indicating the filter unit size for processing the current image frame by the loop filter, and the first syntax element is signaled based on the superblock size.

(A9) In some embodiments of A6 or A7, the video bitstream includes a first syntax element indicating the filter unit size for processing the current image frame by the loop filter, and the first syntax element includes a binary integer that is equal to a difference of a binary logarithm of the filter unit size and a binary logarithm of the superblock size.

(A10) In some embodiments of any of A1-A9, the first filtering block is split into a plurality of sub-filter units according to a tree structure, and a control flag associated with the first filter control parameter is signaled on a sub-filter unit level and corresponds to a first one of the sub-filter units of the first filtering block.

(A11) In some embodiments of any of A1-A10, the video bitstream includes a first syntax element indicating the filter unit size for processing the current image frame by the loop filter. The first syntax element is signaled on a frame level for the current image frame, and the filter unit size includes a fixed filter unit size. The video bitstream further includes a second syntax element indicating a block-level filter unit size for a set of one or more superblock of the current image frame. The second syntax element includes an index defining a scaling factor between the fixed filter unit size and the block-level filter unit size.

(A12) In some embodiments of A11, the index is equal to one of 0, 1, 2, and corresponds to the scaling factor equal to one of 1, 4, and 16, respectively, and the block-level filter unit size is equal to 1×, 4×, or 16× of the fixed filter unit size.

(A13) In some embodiments of any of A1-A12, the video bitstream further includes a pointer index associated with a second filtering block of the current image frame. The pointer index identifies the first filtering block and controls the loop filter to process the second filtering block based on the first filter control parameter associated with the first filtering block.

(A14) In some embodiments of any of A1-A13, the loop filter includes a cross-component sample offset (CCSO) mode, and the first filter control parameter indicates whether the CCSO mode is enabled to apply one or more samples of a first color component to determine sample offsets of samples of a second color component.

(A15) In some embodiments of A14, the loop filter further includes one or more additional filtering operations distinct from the CCSO mode, and the filter unit size is signaled in a first syntax element for the CCSO mode and the one or more additional filtering operations jointly.

(A16) In some embodiments of A15, the one or more additional filtering operations include at least one of Wiener filtering and cross-component Wiener filtering.

(A17) In some embodiments of any of A14-A16, the method 600 further includes identifying a set of luma samples in the one or more samples. The set of luma samples includes one or more of a first luma sample and one or more neighboring luma samples, and the first luma sample is collocated with a first color sample of the second color component to be determined in the CCSO mode in the first filter block. The method 600 further includes determining the first sample offset of the first color sample based on the set of luma samples and adjusting the first color sample based on the first sample offset of the first color sample.

(A18) In some embodiments of A17, the method 600 further includes determining one or more difference values between the one or more neighboring luma samples and the first luma sample that is collocated with of the first color sample; quantizing the one or more difference values to generate one or more quantized values; and classifying the first color sample based on the one or more quantized values to determine the first sample offset of the first color sample.

(A19) In some embodiments of A17, the method 600 further includes quantizing the set of luma samples to generate one or more quantized values; and classifying the first color sample based on the one or more quantized values to determine the first sample offset of the first color sample.

(A20) In some embodiments of any of A1-A19, the filter unit size of the current image frame is determined based on coded information, the coded information including one or more of: a quantization parameter, an image resolution, a tile size, whether the current image frame is an intra-only frame, a temporal layer, and whether the current image frame is an interpolated frame.

(A21) In some embodiments of A20, the current image frame is interpolated from two additional image frames.

(A22) In some embodiments of any of A1-A21, the filter unit size includes a first filter unit size. An alternative image frame corresponds to a second filter unit size for processing the alternative image frame by the loop filter. A resolution of the current image frame is greater than a resolution of the alternative image frame, and the first filter unit size is greater than the second filter unit size.

(A23) In some embodiments, a computing system comprises control circuitry and memory storing one or more programs configured to be executed by the control circuitry. The one or more programs further comprise instructions for receiving video data comprising a current image frame; encoding the current image frame; transmitting the encoded current image frame via a video bitstream; and signaling, via the video bitstream, a first filter control parameter for a loop filter to process a first filtering block of the current image frame. A filter unit size is configured to be determined for processing the current image frame by the loop filter, and applied to identify the first filtering block to be processed by the loop filter based on the first filter control parameter.

(A24) In some embodiments, a non-transitory computer-readable storage medium stores one or more programs for execution by control circuitry of a computing system. The one or more programs comprise instructions for obtaining a source video sequence including a current image frame and performing a conversion between the source video sequence and a video bitstream. The video bitstream comprises the current image frame and a first filter control parameter for a loop filter to process a first filtering block of the current image frame. A filter unit size is configured to be determined for processing the current image frame by the loop filter, and applied to identify the first filtering block to be processed by the loop filter based on the first filter control parameter.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A24 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A24 above).

The proposed methods may be used separately or combined in any order. Further, each of the methods (or embodiments), encoder, and decoder may be implemented by processing circuitry (e.g., one or more processors or one or more integrated circuits). For example, the one or more processors execute a program that is stored in a non-transitory computer-readable medium. In the following, the term block may be interpreted as a prediction block, a coding block, or a coding unit, i.e., CU.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
receiving a video bitstream including a current image frame and a first filter control parameter for a loop filter to process a first filtering block of the current image frame, wherein the current image frame has a superblock size representing the largest coding unit size applied to code the current image frame;
determining a filter unit size for processing the current image frame by the loop filter, the first filtering block having the filter unit size that is equal to or greater than the superblock size;
identifying the first filtering block in the current image frame based on the filter unit size;
when the first filter control parameter is enabled, applying the loop filter to process one or more samples of the first filtering block; and
reconstructing the current image frame including the first filtering block.

2. The method of claim 1, wherein the video bitstream includes a first syntax element indicating the filter unit size for processing the current image frame by the loop filter, and the first syntax element is signaled for a first one of a plurality of color components in one of: a sequence level, a frame level, and a tile header of the current image frame, wherein the filter unit size is determined based on the first syntax element signaled by the video bitstream.

3. The method of claim 2, wherein the video bitstream includes a plurality of syntax elements that further include the first syntax element, and the plurality of syntax elements are signaled for the plurality of color components separately.

4. The method of claim 2, wherein the filter unit size includes a first filter unit size, and a second one of the plurality of color components is not signaled and has a second filter unit size, wherein the second filter unit size has a predefined relationship with, is configured to be determined based on, the first filter unit size.

5. The method of claim 4, wherein:
the plurality of color components include a luma component and a chroma component, and the current image frame has a chroma format of 4:2:0; and
the second filter unit size is twice or a half of the first filter unit size.

6. The method of claim 1, wherein a first filter unit size for luma components of the current image frame is 128×128, and a second filter unit size for chroma components of the current image frame is 64×64.

7. The method of claim 1, wherein the video bitstream includes a first syntax element indicating the filter unit size for processing the current image frame by the loop filter, and the first syntax element is signaled based on the superblock size.

8. The method of claim 1, wherein the video bitstream includes a first syntax element indicating the filter unit size for processing the current image frame by the loop filter, and the first syntax element includes a binary integer that is equal to a difference of a binary logarithm of the filter unit size and a binary logarithm of the superblock size.

9. The method of claim 1, wherein the first filtering block is split into a plurality of sub-filter units according to a tree structure, and a control flag associated with the first filter control parameter is signaled on a sub-filter unit level and corresponds to a first one of the sub-filter units of the first filtering block.

10. The method of claim 1, wherein:

the video bitstream includes a first syntax element indicating the filter unit size for processing the current image frame by the loop filter;

the first syntax element is signaled on a frame level for the current image frame, and the filter unit size includes a fixed filter unit size; and the video bitstream further includes a second syntax element indicating a block-level filter unit size for a set of one or more superblock of the current image frame, the second syntax element including an index defining a scaling factor between the fixed filter unit size and the block-level filter unit size.

11. The method of claim 10, wherein the index is equal to one of 0, 1, 2, and corresponds to the scaling factor equal to one of 1, 4, and 16, respectively, and the block-level filter unit size is equal to 1×, 4×, or 16× of the fixed filter unit size.

12. The method of claim 1, wherein the video bitstream further includes a pointer index associated with a second filtering block of the current image frame, and the pointer index identifies the first filtering block and controls the loop filter to process the second filtering block based on the first filter control parameter associated with the first filtering block.

13. The method of claim 1, wherein the loop filter includes a cross-component sample offset (CCSO) mode, and the first filter control parameter indicates whether the CCSO mode is enabled to apply one or more samples of a first color component to determine sample offsets of samples of a second color component.

14. The method of claim 13, wherein the loop filter further includes one or more additional filtering operations distinct from the CCSO mode, and the filter unit size is signaled in a first syntax element for the CCSO mode and the one or more additional filtering operations jointly.

15. The method of claim 14, wherein the one or more additional filtering operations include at least one of Wiener filtering and cross-component Wiener filtering.

16. The method of claim 13, further comprising:

identifying a set of luma samples in the one or more samples, wherein the set of luma samples includes one or more of a first luma sample and one or more neighboring luma samples, and the first luma sample is collocated with a first color sample of the second color component to be determined in the CCSO mode in the first filter block;

determining a first sample offset of the first color sample based on the set of luma samples; and adjusting the first color sample based on the first sample offset of the first color sample.

17. The method of claim 16, further comprising:

determining one or more difference values between the one or more neighboring luma samples and the first luma sample that is collocated with of the first color sample;

quantizing the one or more difference values to generate one or more quantized values; and classifying the first color sample based on the one or more quantized values to determine the first sample offset of the first color sample.

18. The method of claim 16, further comprising:

quantizing the set of luma samples to generate one or more quantized values; and classifying the first color sample based on the one or more quantized values to determine the first sample offset of the first color sample.

19. The method of claim 1, wherein the filter unit size of the current image frame is determined based on coded information, the coded information including one or more of: a quantization parameter, an image resolution, a tile size, whether the current image frame is an intra-only frame, a temporal layer, and whether the current image frame is an interpolated frame, the method further comprising determining whether the first filter control parameter associated with the first filtering block is enabled.

20. The method of claim 19, wherein the current image frame is interpolated from two additional image frames.

21. The method of claim 1, wherein:

the filter unit size includes a first filter unit size;

an alternative image frame corresponds to a second filter unit size for processing the alternative image frame by the loop filter; and a resolution of the current image frame is greater than a resolution of the alternative image frame, and the first filter unit size is greater than the second filter unit size.

22. A computing system, comprising:

control circuitry; and memory storing one or more programs configured to be executed by the control circuitry, the one or more programs further comprising instructions for:

receiving video data comprising a current image frame;

encoding the current image frame, wherein the current image frame has a superblock size representing the largest coding unit size applied to code the current image frame;

transmitting the encoded current image frame via a video bitstream; and signaling, via the video bitstream, a first filter control parameter for a loop filter to process a first filtering block of the current image frame;

wherein a filter unit size is configured to be determined for processing the current image frame by the loop filter, the filter size unit is equal to or greater than the superblock size and applied to identify the first filtering block to be processed by the loop filter based on the first filter control parameter.

23. A non-transitory computer-readable storage medium storing a video bitstream that is generated by a video encoding method, the video encoding method comprising:

receiving video data comprising a current image frame;

encoding the current image frame, wherein the current image frame has a superblock size representing the largest coding unit size applied to code the current image frame;

transmitting the encoded current image frame via a video bitstream; and signaling, via the video bitstream, a first filter control parameter for a loop filter to process a first filtering block of the current image frame;

wherein a filter unit size is configured to be determined for processing the current image frame by the loop filter, the filter size unit is equal to or greater than the superblock size and applied to identify the first filtering block to be processed by the loop filter based on the first filter control parameter; and wherein the video bitstream comprises the encoded current image frame and the first filter control parameter.

* * * * *